(12) United States Patent
Olsson

(10) Patent No.: US 10,422,357 B2
(45) Date of Patent: Sep. 24, 2019

(54) ADAPTIVE CONTROL OF HYDRAULIC TOOL ON REMOTE CONTROLLED DEMOLITION ROBOT

(71) Applicant: HUSQVARNA AB, Huskvarna (SE)

(72) Inventor: Tommy Olsson, Mölndal (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/769,210

(22) PCT Filed: Oct. 19, 2016

(86) PCT No.: PCT/SE2016/051021
§ 371 (c)(1),
(2) Date: Apr. 18, 2018

(87) PCT Pub. No.: WO2017/069692
PCT Pub. Date: Apr. 27, 2017

(65) Prior Publication Data
US 2018/0320711 A1    Nov. 8, 2018

(30) Foreign Application Priority Data
Oct. 19, 2015    (SE) ..................... 1551349

(51) Int. Cl.
*F15B 11/16*    (2006.01)
*E02F 9/20*    (2006.01)
(Continued)

(52) U.S. Cl.
CPC ............ *F15B 11/165* (2013.01); *E02F 3/965* (2013.01); *E02F 9/205* (2013.01); *E02F 9/207* (2013.01);
(Continued)

(58) Field of Classification Search
CPC combination set(s) only.
See application file for complete search history.

(56) References Cited

U.S. PATENT DOCUMENTS

| 2,008,053 A |   | 7/1935 | Whiteside |
| 2,160,217 A | * | 5/1939 | Kingsbury ............ B23Q 5/261 |
|             |   |        | 60/383 |

(Continued)

FOREIGN PATENT DOCUMENTS

| CN | 101245871 A | 8/2008 |
| CN | 101763121 A | 6/2010 |

(Continued)

OTHER PUBLICATIONS

International Search Report and Written Opinion for International Application No. PCT/SE2016/051021 dated Jan. 12, 2017.

(Continued)

*Primary Examiner* — Yuri Kan
(74) *Attorney, Agent, or Firm* — Burr & Forman LLP

(57) ABSTRACT

A remote controlled demolition robot (10) comprising a controller (17) and at least one actuator (12) controlled through a hydraulic system (400) comprising at least one valve (13a) connected to a corresponding actuator for a tool (11b) and a pump (410). The controller (17) is configured to operate in a first mode wherein the fluid flow is controlled through the at least one valve (13a), wherein said valve (13a) is a proportional valve, receive a pressure indication indicating a pressure in the hydraulic system (400) and determine if the pressure in the hydraulic system (400) is above a first mode threshold and/or if a pressure change fulfills a first mode condition, and if so operate in a second mode wherein the at least one valve (13a) is in an opened state and the fluid flow is controlled through the pump (410).

18 Claims, 5 Drawing Sheets

(51) Int. Cl.

| | | |
|---|---|---|
| *E02F 9/22* | (2006.01) | |
| *F15B 13/02* | (2006.01) | |
| *B66F 7/06* | (2006.01) | |
| *B23Q 5/22* | (2006.01) | |
| *B23Q 5/26* | (2006.01) | |
| *E04G 23/08* | (2006.01) | |
| *F15B 11/04* | (2006.01) | |
| *F15B 11/042* | (2006.01) | |
| *E02F 3/96* | (2006.01) | |
| *G05D 1/00* | (2006.01) | |

(52) U.S. Cl.
CPC .......... *E02F 9/2203* (2013.01); *E02F 9/2228* (2013.01); *E04G 23/08* (2013.01); *F15B 11/0406* (2013.01); *F15B 11/0423* (2013.01); *G05D 1/0011* (2013.01); *F15B 2211/20546* (2013.01); *F15B 2211/251* (2013.01); *F15B 2211/252* (2013.01); *F15B 2211/255* (2013.01); *F15B 2211/3144* (2013.01); *F15B 2211/351* (2013.01); *F15B 2211/413* (2013.01); *F15B 2211/455* (2013.01); *F15B 2211/605* (2013.01); *F15B 2211/6306* (2013.01); *F15B 2211/6309* (2013.01); *F15B 2211/6313* (2013.01); *F15B 2211/6652* (2013.01); *F15B 2211/6653* (2013.01); *F15B 2211/6654* (2013.01); *F15B 2211/6658* (2013.01); *F15B 2211/7051* (2013.01); *F15B 2211/7058* (2013.01); *F15B 2211/7135* (2013.01); *F15B 2211/851* (2013.01); *G05D 2201/0202* (2013.01)

(56) References Cited

U.S. PATENT DOCUMENTS

| | | | |
|---|---|---|---|
| 2,214,389 A * | 9/1940 | Wahlmark | B23Q 5/26 60/375 |
| 2,427,970 A * | 9/1947 | Mathys | B23Q 5/26 60/383 |
| 3,228,659 A * | 1/1966 | Sturm | B66F 7/065 182/141 |
| 3,963,039 A | 6/1976 | Coeurderoy | |
| 4,121,610 A * | 10/1978 | Harms | F15B 13/02 137/115.03 |
| 5,222,417 A | 6/1993 | Sato | |
| 5,235,809 A | 8/1993 | Farrell | |
| 5,355,676 A | 10/1994 | Inokuchi | |
| 6,058,632 A | 5/2000 | Hawkins | |
| 6,138,810 A | 10/2000 | Fujii et al. | |
| 6,305,162 B1 | 10/2001 | Cobo et al. | |
| 6,397,655 B1 | 6/2002 | Stephenson | |
| 6,571,190 B2 | 5/2003 | Hou et al. | |
| 6,792,902 B2 | 9/2004 | Simpson | |
| 7,434,393 B2 | 10/2008 | Hesse | |
| 7,878,770 B2 | 2/2011 | Oka | |
| 8,061,180 B2 | 11/2011 | Green | |
| 8,281,757 B2 | 10/2012 | Tomimatsu et al. | |
| 8,321,096 B2 | 11/2012 | Sandstrom et al. | |
| 2004/0206155 A1 | 10/2004 | Sosnowski | |
| 2008/0053191 A1 | 3/2008 | Yoo et al. | |
| 2010/0043421 A1 | 2/2010 | Rub | |
| 2011/0061448 A1 | 3/2011 | Cadman et al. | |
| 2011/0197576 A1 | 8/2011 | Wada et al. | |
| 2011/0282519 A1 | 11/2011 | Carlsson | |
| 2012/0137667 A1 | 6/2012 | Jacobsen et al. | |
| 2013/0068309 A1 | 3/2013 | Anderson | |
| 2013/0219877 A1 | 8/2013 | Hughes et al. | |
| 2013/0287601 A1 | 10/2013 | Mori et al. | |
| 2013/0297045 A1 | 11/2013 | Yuan et al. | |
| 2013/0312397 A1 | 11/2013 | Callaway et al. | |
| 2013/0332036 A1 * | 12/2013 | Yamamoto | E02F 9/123 701/50 |
| 2014/0060020 A1 | 3/2014 | Peterson et al. | |
| 2014/0174069 A1 | 6/2014 | Kuehn et al. | |
| 2015/0113969 A1 | 4/2015 | Kochhan et al. | |
| 2015/0136505 A1 | 5/2015 | Bystedt | |
| 2015/0159682 A1 | 6/2015 | Bae et al. | |
| 2015/0240455 A1 * | 8/2015 | Takebayashi | E02F 9/2203 60/421 |
| 2015/0299987 A1 * | 10/2015 | Ueda | E02F 3/32 414/687 |

FOREIGN PATENT DOCUMENTS

| | | |
|---|---|---|
| CN | 102165201 A | 8/2011 |
| CN | 203035627 U | 7/2013 |
| DE | 103 40 993 A1 | 3/2005 |
| DE | 103 42 037 A1 | 4/2005 |
| EP | 0 796 952 A1 | 9/1997 |
| EP | 2 508 680 A2 | 10/2012 |
| EP | 2 589 709 A2 | 5/2013 |
| SE | 1050386 A1 | 10/2011 |
| WO | 99/04936 A1 | 2/1999 |
| WO | 00/78510 A2 | 12/2000 |
| WO | 2014/207474 A2 | 12/2014 |
| WO | 2015/117960 A1 | 8/2015 |

OTHER PUBLICATIONS

International Search Report and Written Opinion for International Application No. PCT/SE2016/051014 dated Jan. 20, 2017.
International Search Report and Written Opinion for International Application No. PCT/SE2016/051015 dated Jan. 20, 2017.
International Preliminary Report on Patentability for International Application No. PCT/SE2016/051021 dated Apr. 24, 2018.
International Preliminary Report on Patentability for International Application No. PCT/SE2016/051014 dated Apr. 24, 2018.
International Preliminary Report on Patentability for International Application No. PCT/SE2016/051015 dated Apr. 24, 2018.

* cited by examiner

ADAPTIVE CONTROL OF HYDRAULIC TOOL ON REMOTE CONTROLLED DEMOLITION ROBOT

TECHNICAL FIELD

This application relates to controlling a hydraulic tool on a remote demolition robot, and in particular to a method and an apparatus for providing an adaptive control of a hydraulic tool on a remote demolition robot using a load sensing hydraulic system.

BACKGROUND

Contemporary remote demolition robots using hydraulic tools sometimes experience a problem when the hydraulic pressure of a tool differs from the hydraulic pressure of other actuators, such as arms or booms. A load sensing hydraulic system functions in such a way that the flow of the hydraulic fluid supplied by one (or more) pump(s) is shared between more than one actuator, an actuator in this application meaning a hydraulic motor or cylinder for operating a robot member such as an arm, a boom, a tool, a tool holder or a hand to mention a few examples. With reference to FIG. 1, such actuators may be the cylinders 12 for operating the arms 11, or with reference to FIG. 3, the motor (not shown explicitly) for operating a power saw or a rotating drum cutter 11b being two examples of a tool.

When a saw or rotating drum cutter (hereafter simply referred to as a cutter) is first activated it revs up, bringing for example the saw blade to rotate at a very high revolution speed. When this is done, the saw blade or cutter is most likely not in contact with the material to be cut and the revving up can thus be performed at a very low pressure.

Load sensing hydraulic systems operate in such a manner that the flow generated by one pump is shared among more than one actuator. If one actuator is operating at a low pressure and another actuator is operating at a high pressure and when the pump is operating to provide full flow, all or most of the fluid will flow in the direction presenting the least pressure. The situation may thus occur that the arms are operated to move the cutter in to close vicinity of for example a wall and then as the cutter or saw is revved up, which happens at low pressure, the fluid will redirect itself to the tool, leaving the arms unworkable, the cylinders for the arms presenting a much higher working pressure. The arms will thus not be operable and the tool can not be moved while operating freely.

To overcome this, the prior art provides for using a proportional hydraulic valve. Such a valve does not open fully and only allows a portion of the flow to pass through, for example 75-80%, leaving the remaining 20-25% of fluid flow to flow to other actuators. In such a manner the flow is shared between different actuators.

However, such a proportional valve, actively throttling the flow, generates an energy loss which is dissipated in the form of heat. Not only does this reduce the amount of power that is available from what is delivered by the pump by approximately 1.2 kW in an example where the available power is 18 kW, the reduction thus representing a fair share of the available power, but it also increases the temperature of the hydraulic fluid which leads to a decreased lubrication which can, in turn, decrease the longevity or lifespan of some components.

There is thus a need for a remote controlled demolition robot that is able to operate fully irrespective of what function is undertaken even when flow is shared between several actuators.

SUMMARY

One object of the present teachings herein is to solve, mitigate or at least reduce the drawbacks of the background art, which is achieved by the appended claims.

A first aspect of the teachings herein provides a remote controlled demolition robot comprising a controller and at least one actuator controlled through a hydraulic system comprising at least one valve connected to a corresponding actuator for a tool and a pump, wherein the controller is configured to: operate in a first mode wherein the fluid flow is controlled through the at least one valve, wherein said valve is a proportional valve; receive a pressure indication indicating a pressure in the hydraulic system and determine if the pressure in the hydraulic system is above a first mode threshold and/or if a pressure change fulfills a first mode condition, and if so operate in a second mode wherein the at least one valve is in an opened state and fluid flow is controlled through the pump.

A second aspect provides a method for operating a remote controlled demolition robot comprising at least one actuator controlled through a hydraulic system comprising at least one valve connected to a corresponding actuator for a tool and a pump, wherein the method comprises: operating in a first mode wherein the fluid flow is controlled through the at least one valve, wherein said valve is a proportional valve; receiving a pressure indication indicating a pressure in the hydraulic system and determining if the pressure in the hydraulic system is above a first mode threshold and/or if a pressure change fulfills a first mode condition, and if so operate in a second mode wherein the at least one valve is in an opened state and the fluid flow is controlled through the pump.

A third aspect provides a computer-readable medium comprising software code instructions, that when loaded in and executed by a controller causes the execution of a method according to herein.

One benefit is that such a demolition robot is enabled to operate irrespective of what tools are used and without wasting energy or generating heat unnecessarily.

Compared with, for example, throttling all valves 13a, when the flow required to maintain a pressure is higher than the maximum flow of the pump, the present invention has the benefit of valves 13a having a simple construction and saving energy, providing a higher power efficiency. Calculations have shown that an increase in power efficiency of approximately 10-20% is to be expected.

Other features and advantages of the disclosed embodiments will appear from the following detailed disclosure, from the attached dependent claims as well as from the drawings.

BRIEF DESCRIPTION OF DRAWING

The invention will be described below with reference to the accompanying figures wherein.

DETAILED DESCRIPTION

Figure 1:
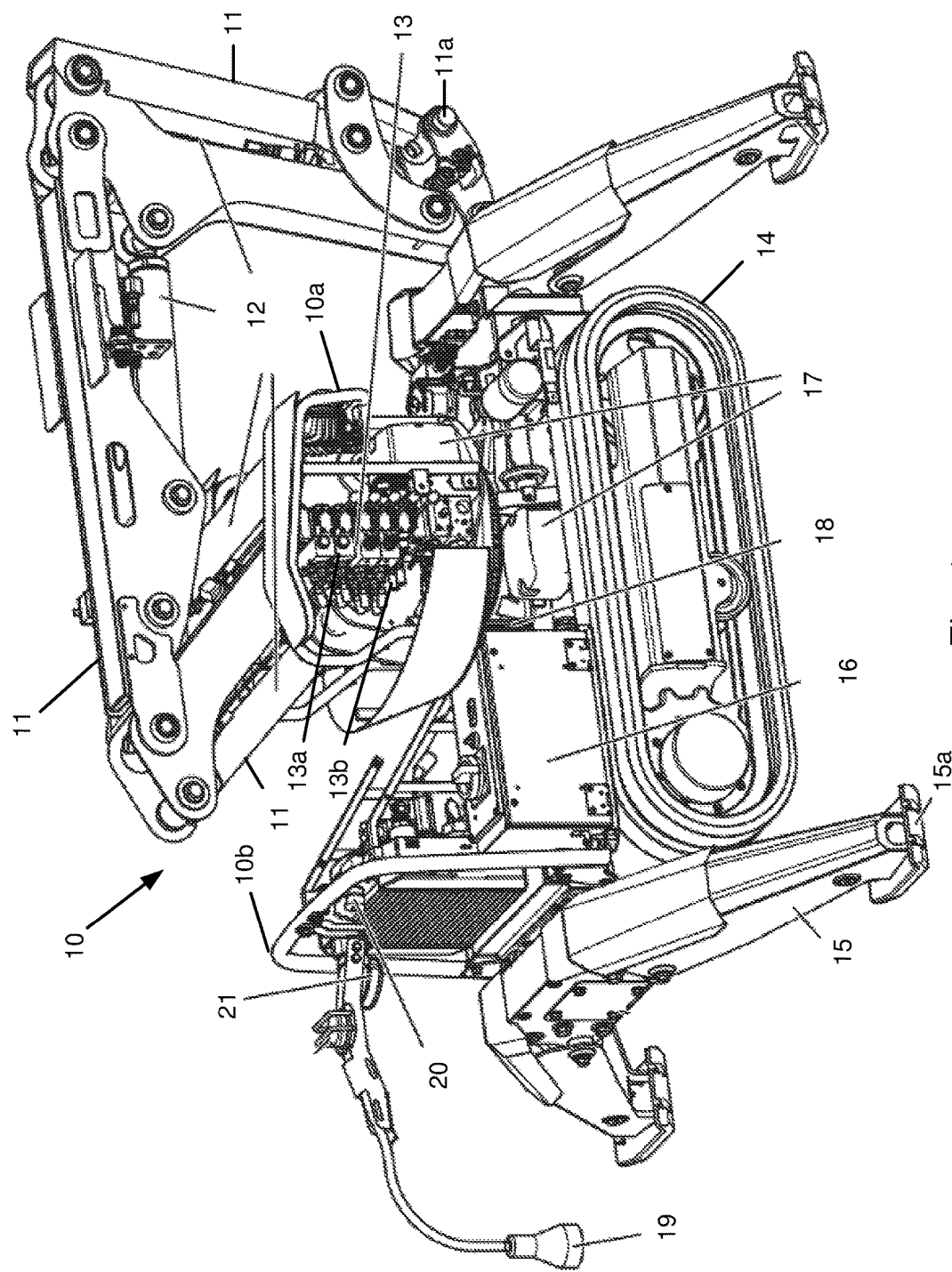
FIG. 1 shows a remote controlled demolition robot according to an embodiment of the teachings herein.

FIG. 1 shows a remote controlled demolition robot 10, hereafter simply referred to as the robot 10. The robot 10 comprises one or more robot members, such as arms 11, the arms 11 possibly constituting one (or more) robot arm member(s). One member may be an accessory tool holder 11a for holding an accessory 11b (not shown in FIG. 1, see FIG. 3). The accessory 11b may be a tool such as a hydraulic breaker (or hammer), a cutter (or a rotary concrete cutter), a saw, or a digging bucket to mention a few examples. The accessory may also be a payload to be carried by the robot 10. The arms 11 are movably operable through at least one cylinder 12 for each arm 11. The cylinders are preferably hydraulic and controlled through a hydraulic valve block 13 housed in the robot 10.

The hydraulic valve block 13 comprises one or more valves 13a for controlling the amount of hydraulic fluid (oil) provided to for example a corresponding cylinder 12. The valve 13a is a proportional hydraulic valve.

The valve block 13 also comprises (possibly by being connected to) at least one pressure sensor 13b for determining the pressure before or after a valve 13a.

Further details on the hydraulic system will be given with reference to FIG. 4 below.

The robot 10 comprises caterpillar tracks 14 that enable the robot 10 to move. The robot may alternatively or additionally have wheels for enabling it to move, both wheels and caterpillar tracks being examples of drive means. The robot further comprises outriggers 15 that may be extended individually (or collectively) to stabilize the robot 10. At least one of the outriggers 15 may have a foot 15a (possibly flexibly arranged on the corresponding outrigger 15) for providing more stable support in various environments. The robot 10 is driven by a drive system 16 operably connected to the caterpillar tracks 14 and the hydraulic valve block 13. The drive system may comprise an electrical motor in case of an electrically powered robot 10 powered by a battery and/or an electrical cable 19 connected to an electrical grid (not shown), or a cabinet for a fuel tank and an engine in case of a combustion powered robot 10.

The body of the robot 10 may comprise a tower 10a on which the arms 11 are arranged, and a base 10b on which the caterpillar tracks 14 are arranged. The tower 10a is arranged to be rotatable with regards to the base 10b which enables an operator to turn the arms 11 in a direction other than the direction of the caterpillar tracks 14.

The operation of the robot 10 is controlled by one or more controllers 17, comprising at least one processor or other programmable logic and possibly a memory module for storing instructions that when executed by the processor controls a function of the demolition robot 10. The one or more controllers 17 will hereafter be referred to as one and the same controller 17 making no differentiation of which processor is executing which operation. It should be noted that the execution of a task may be divided between the controllers wherein the controllers will exchange data and/or commands to execute the task.

The robot 10 may further comprise a radio module 18. The radio module 18 may be used for communicating with a remote control (see FIG. 2, reference 22) for receiving commands to be executed by the controller 17 The radio module 18 may be used for communicating with a remote server (not shown) for providing status information and/or receiving information and/or commands. The controller may thus be arranged to receive instructions through the radio module 18. The radio module may be configured to operate according to a low energy radio frequency communication standard such as ZigBee®, Bluetooth® or WiFi®. Alternatively or additionally, the radio module 18 may be configured to operate according to a cellular communication standard, such as GSM (Global System Mobile) or LTE (Long Term Evolution).

The robot 10, in case of an electrically powered robot 10) comprises a power cable 19 for receiving power to run the robot 10 or to charge the robots batteries or both. The robot may also operate solely or partially on battery power.

The robot 10, being a hydraulic robot, comprises a motor (not shown) that is arranged to drive a pump (referenced 410 in FIG. 4) for driving the hydraulic system. More details on the hydraulic system are given with reference to FIG. 4 below.

For wired control of the robot 10, the remote control 22 may alternatively be connected through or along with the power cable 19. The robot may also comprise a Human-Machine Interface (HMI), which may comprise control buttons, such as a stop button 20, and light indicators, such as a warning light 21.

Figure 2:
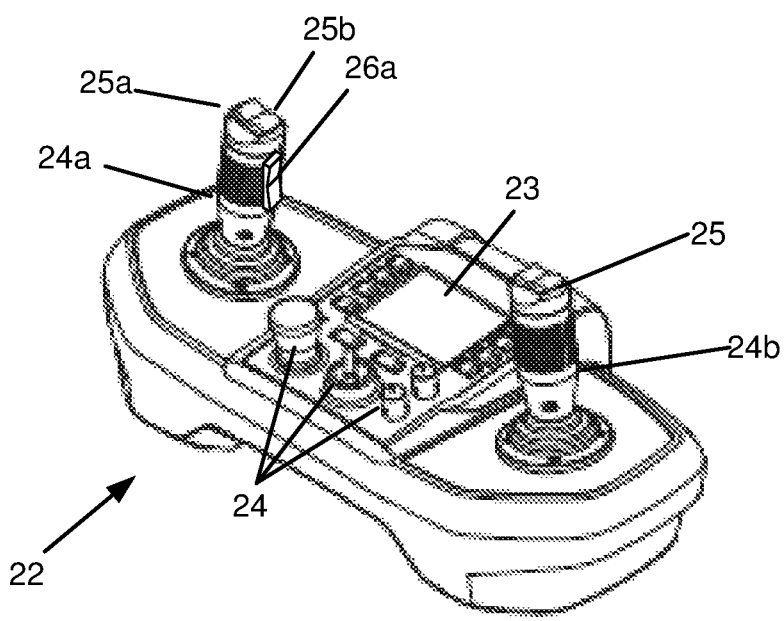
FIG. 2 shows a remote control 22 for a remote controlled demolition robot according to an embodiment of the teachings herein.

FIG. 2 shows a remote control 22 for a remote controlled demolition robot such as the robot 10 in FIG. 1. The remote control 22 may be assigned an identity code so that a robot 10 may identify the remote control and only accept commands from a correctly identified remote control 22. This enables for more than one robot 10 to be working in the same general area. The remote control 22 has one or more displays 23 for providing information to an operator, and one or more controls 24 for receiving commands from the operator. The controls 24 include one or more joysticks, a left joystick 24a and a right joystick 24b for example as shown in FIG. 2, being examples of a first joystick 24a and a second joystick 24b. It should be noted that the labeling of a left and a right joystick is merely a labeling used to differentiate between the two joysticks 24a, 24b. A joystick 24a, 24b may further be arranged with a top control switch 25. In the example of FIG. 2A, each joystick 24a, 24b is arranged with two top control switches 25a, 25b. The joysticks 24a, 24b and the top control switches 25 are used to provide maneuvering commands to the robot 10. The control switches 24 may be used to select one out of several operating modes, wherein an operating mode determines which control input corresponds to which action. For example: in a Transport mode, the left joystick 24a may control the caterpillar tracks 14 and the right joystick 24b may control the tower 10a (which can come in handy when turning in narrow passages); whereas in a Work mode, the left joystick 24a controls the tower 10a, the tool 11b and some movements of the arms 11, and the right joystick 24b controls other movements of the arms 11; and in a Setup mode, the each joystick 24a, 24b controls each a caterpillar track 14, and also controls the outrigger(s) 15 on a corresponding side of the robot 10. It should be noted that other associations of functions to joysticks and controls are also possible.

The remote control 22 may be seen as a part of the robot 10 in that it is the control panel of the robot 10. This is especially apparent when the remote control is connected to the robot through a wire. However, the remote control 22 may be sold separately to the robot 10 or as an additional accessory or spare part.

The remote control 22 is thus configured to provide control information, such as commands, to the robot 10 which information is interpreted by the controller 17, causing the robot 10 to operate according to the actuations of the remote control 22.

Figure 3:
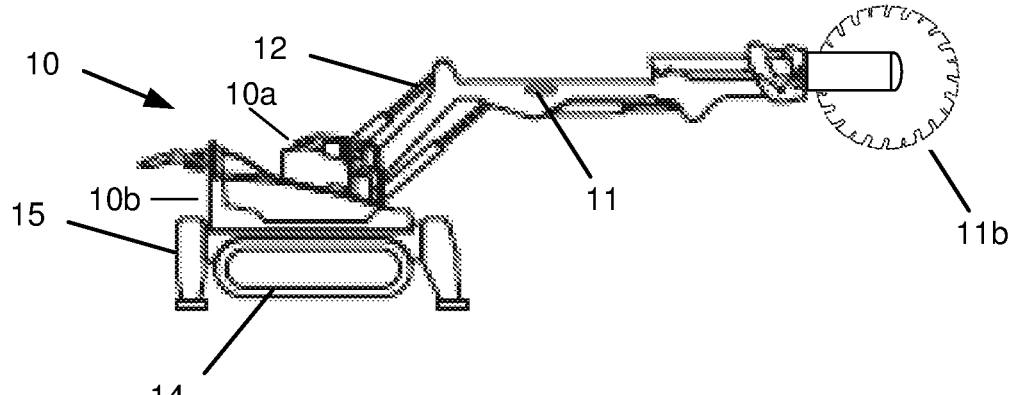
FIG. 3 shows a schematic view of a robot according to an embodiment of the teachings herein.

FIG. 3 shows a schematic view of a robot 10 according to FIG. 1. In FIG. 3, the caterpillar tracks 14, the outriggers 15, the arms 11 and the hydraulic cylinders 12 are shown. A tool 11b, in the form of a transverse drum or a circular cutter 11b or any other tool having a rotational operation, is also shown (being shaded to indicate that it is optional). The tool will hereafter simply be referred to as the exemplifying cutter.

As the controller 17 receives input relating for example to moving a robot member 11, for example from any of the joysticks 24, the corresponding valve 13a is controlled to open or close depending on the movement or operation to be made. One example of such movements is moving a robot member 11. One example of such operations is activating a tool 11b such as a cutter.

Figure 4:
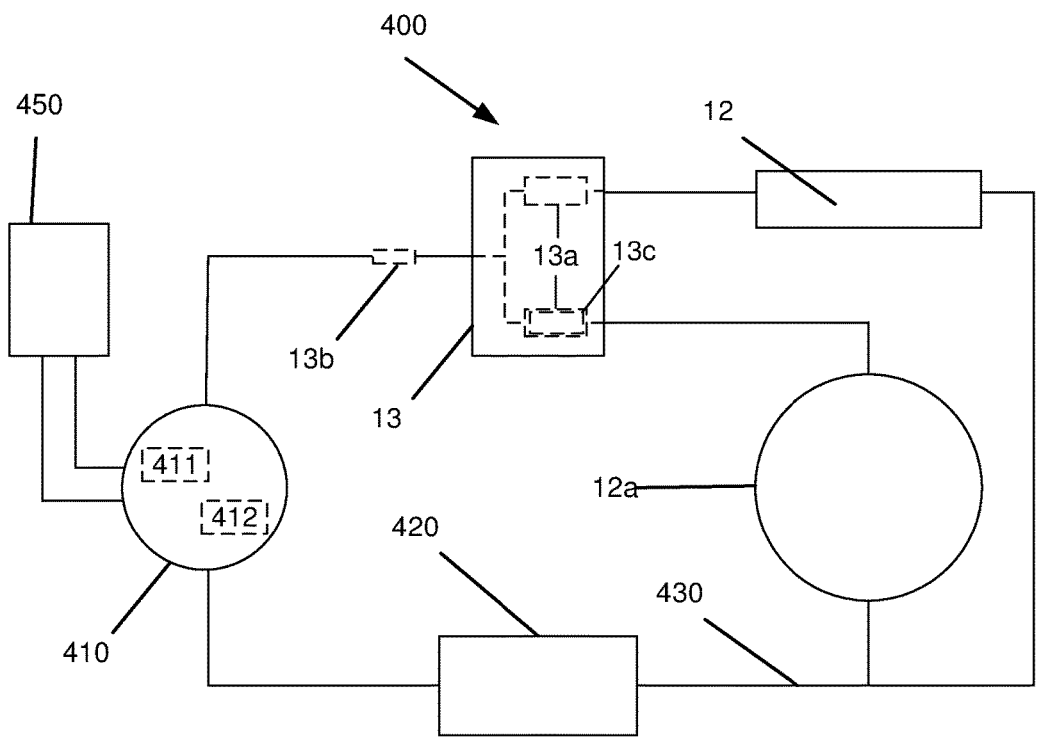
FIG. 4 shows a schematic view of a hydraulic system according to an embodiment of the teachings herein.

FIG. 4 shows a schematic view of a hydraulic system 400 for use in a demolition robot. The demolition robot may be electrically powered. The demolition robot may alternatively be a combustion engine powered robot. The description herein will focus on an electrically powered demolition robot.

The hydraulic system 400 comprises a pump 410 that is driven by for example an electric motor 450. The pump 410 is used to provide a flow of a hydraulic fluid through conduits 430 generating a pressure in the hydraulic system 400. Only when there is some resistance in the hydraulic system, such as when a hydraulic motor is operated, will there be a build up of pressure. Otherwise the fluid will flow freely. The pump 410 is a load sensing variable pump 410. The hydraulic system 400 is a load sensing system and the fluid is propagated to one or more actuators, such as a cylinder 12 that may be used to move an arm 11a or for example a hydraulic motor 12a that may be used to operate a tool, such as a cutter 11b.

The hydraulic system 400 is arranged to operate at a main pressure of for example 200 bars. The hydraulic system may also be arranged to be able to operate at an increased main pressure when more demanding tasks are to be performed such as when maintaining the outriggers in an extended position and/or when a tool requires more power, such as when operating a cutter 11b at an increased pressure.

The hydraulic system 400 also comprises a fluid tank 420 for holding a hydraulic fluid (most often oil) which is led to the various components through the conduits 430.

To enable control of a specific actuator 12, a valve block 13 is used comprising several valves (referenced 13a in FIG. 1). As one valve 13a is opened, a corresponding actuator 12 is activated.

The inventors have realized that as a tool has built up enough pressure, such as when a rotating saw or a rotating drum cutter makes contact with material to be cut, there is no longer a problem with sharing the flow between actuators in that there is no longer any low pressure conduit through which the fluid may flow relatively freely. Thus, the use of proportional valves may be used, as in the prior art, during startup of a tool, whereas when a pressure has been built up, the proportional valve may be opened fully and the operation may be controlled by controlling the pump 410.

Therefore at least one of the valves 13a is a proportional valve 13a. In one embodiment the valve 13a operating the tool 11b is a proportional valve. In one embodiment the valve 13a is over-dimensioned with respect to available pump flow. This allows fluid to flow unrestricted when the valve 13a is fully opened, and keep the pressure drop to a minimum.

Using over-dimensioned valves, such as the valve 13a, brings about the benefit, that as the valve 13a is over-dimensioned, the pump 410 will not be able to build up enough pressure to reach the maximum capacity of the valve 13a—thus reducing the pressure loss caused by the valve 13a. For example, in one embodiment, the valve 13a is enabled to control a tool 11b and is dimensioned to allow a flow of 80 liters/minute (l/m) at a pressure drop of 20 bars. The pump 410 is enabled to deliver 65 l/m and will thus not be able to provide enough flow to build up the pressure drop over the valve—instead of a pressure drop of 20 bars, the over-dimensioned valve 13a may only cause a pressure drop of 10 bars.

However, this adds to the problems discussed in the background section in that, as the pump 410 is not able to build up the maximum pressure of a valve 13a, and as the hydraulic fluid will flow through a conduit 431 having the least pressure, the fluid will flow to the tool being operated at a low pressure thereby possibly rendering other functions (requiring a higher pressure) inoperable.

The inventors have devised a clever and insightful arrangement for controlling the fluid flow of a load sensing hydraulic system 400 by operating in one of two modes; a first mode wherein flow is controlled through the use of proportional valves 13a, and a second mode wherein flow is controlled by controlling the pump 410.

Continuing the example above, as the tool 11b is started and operates at a low pressure, the inventors have realized that in order to benefit from the reduced pressure loss provided by the use of over-dimensioned valves 13a while still not diminishing the operation of other members or functions, the flow should be restricted through the valve 13a in order not to take all available flow from the pump. By using a proportional valve, the valve 13a may thus be restricted to for example 40 l/m. There will thus be enough flow (25 l/m=65-40 l/m in this example) to enable operation of other members or functions. As the tool is brought into operation it will be put under a load, such as when a saw blade hits the subject to be sawed, the pressure in the tool 11b will increase. As the pressure increases, the fluid will start to flow also through other valves (possibly having a lower pressure).

The inventors have further realized that at this point, it will be more beneficial to control the hydraulics with the pump 410 and therefore a switch in operating modes would be beneficial. The inventors therefore propose a two mode operation where when operating at low pressures the control is provided through proportional valves and when operating at high pressures, the control is provided through pump control.

Figure 5A:
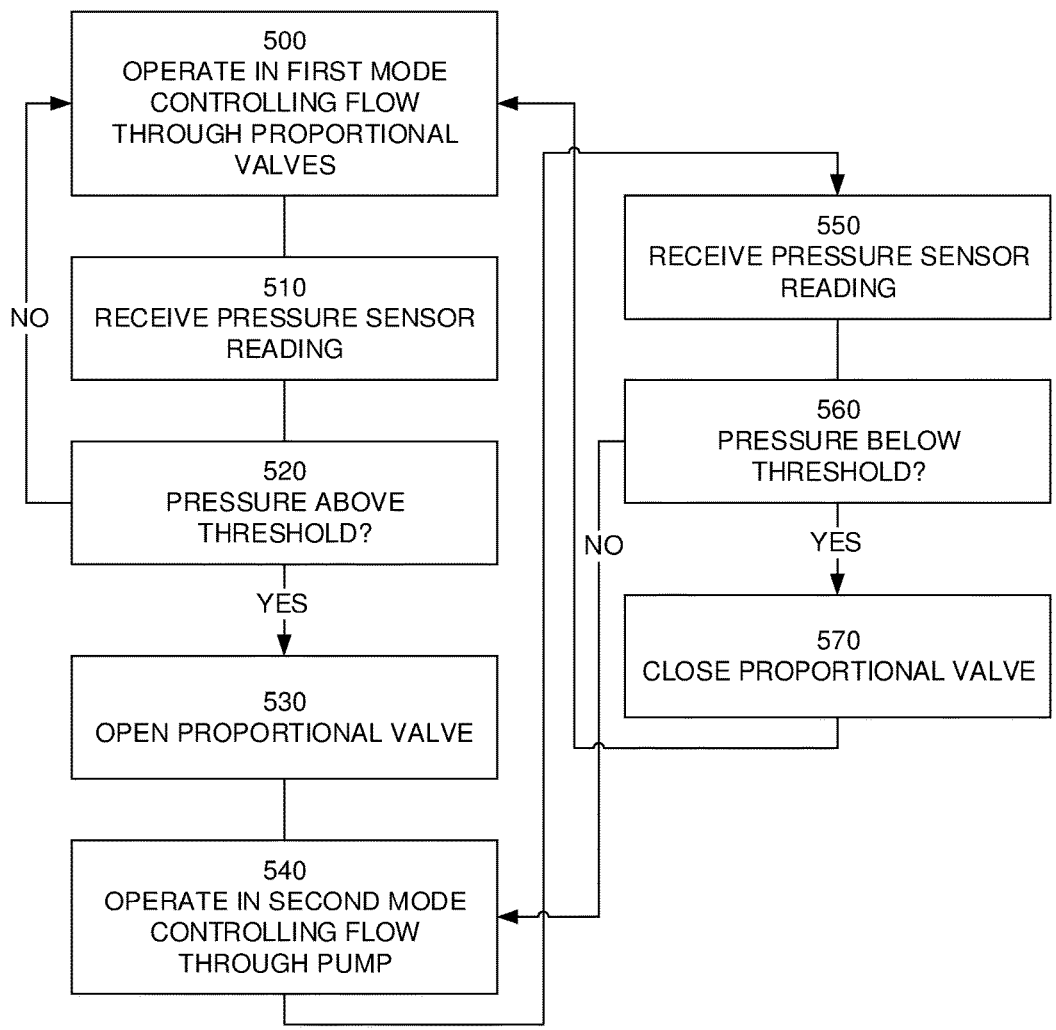
FIG. 5a shows a flowchart for a general method according to an embodiment of the teachings herein.

This arrangement will now be disclosed simultaneously with a method of operating such an arrangement. FIG. 5a shows a flowchart for a general method according to the teachings herein.

In low pressure situations, such as in idle or when moving, the controller 17 is configured to operate in the first mode 500 controlling the flow by using proportional vales 13a.

In one embodiment, the pump 410 comprises a load sensing (LS) regulator 411. The LS regulator 411 is provided to adapt the flow of the pump 410 based on the current need. For example, when a valve is restricted, less flow will be required and the LS regulator 411 regulates the pump 410 so that less fluid is provided further saving power. The pump is thus arranged to operate using the LS regulator in the first mode.

The controller 17 is configured to receive a pressure indication 510. In one embodiment, the pressure indication is provided by the pressure sensor 13b. The pressure sensor 13B may be arranged on or adjacent to the valve 13a, or it may be arranged adjacent to a corresponding actuator 12. The pressure sensor 13b may also or alternatively be arranged on a general conduit for providing an overall system pressure as in FIG. 4. This arrangement saves on cost as the number of pressure sensors needed is reduced. The pressure reading may also be a combined pressure reading representing various pressures in the hydraulic systems. One such combination is a pressure for the tool and a pressure for the overall system.

The controller 17 determines if the pressure indicated by the pressure indication is above a first mode threshold level 520, and if so, the controller opens 530 the valve 13a and starts to operate in a second mode where the flow is controlled by controlling the pump 410.

The first mode threshold may be set based on the minimum pressure required, hereafter the needed pressure, for moving an arm member 11a.

This pressure may be input through for example the remote control 22, or it may be communicated to the controller by a electronic control unit of the tool, such electronic control unit being considered to be part of the controller 17.

In one embodiment, more than one such first mode threshold (sub levels) may be utilized wherein the proportional valve is opened successively as each sub level is reached or continuously as through a ramping function. For example, in idle mode the valve is at 70% and as the pressure exceeds a first mode threshold of 80 bars corresponding to a needed pressure of 100 bars, the valve is opened to 80%. Then, as the pressure exceeds a second first mode threshold of 90 bars, the valve is opened to 90%. And, as the pressure exceeds a third first mode threshold of 100 bars, the valve is opened to 100%. This provides for a smooth and gradual switch between full valve control and full pump control.

Figure 5B:
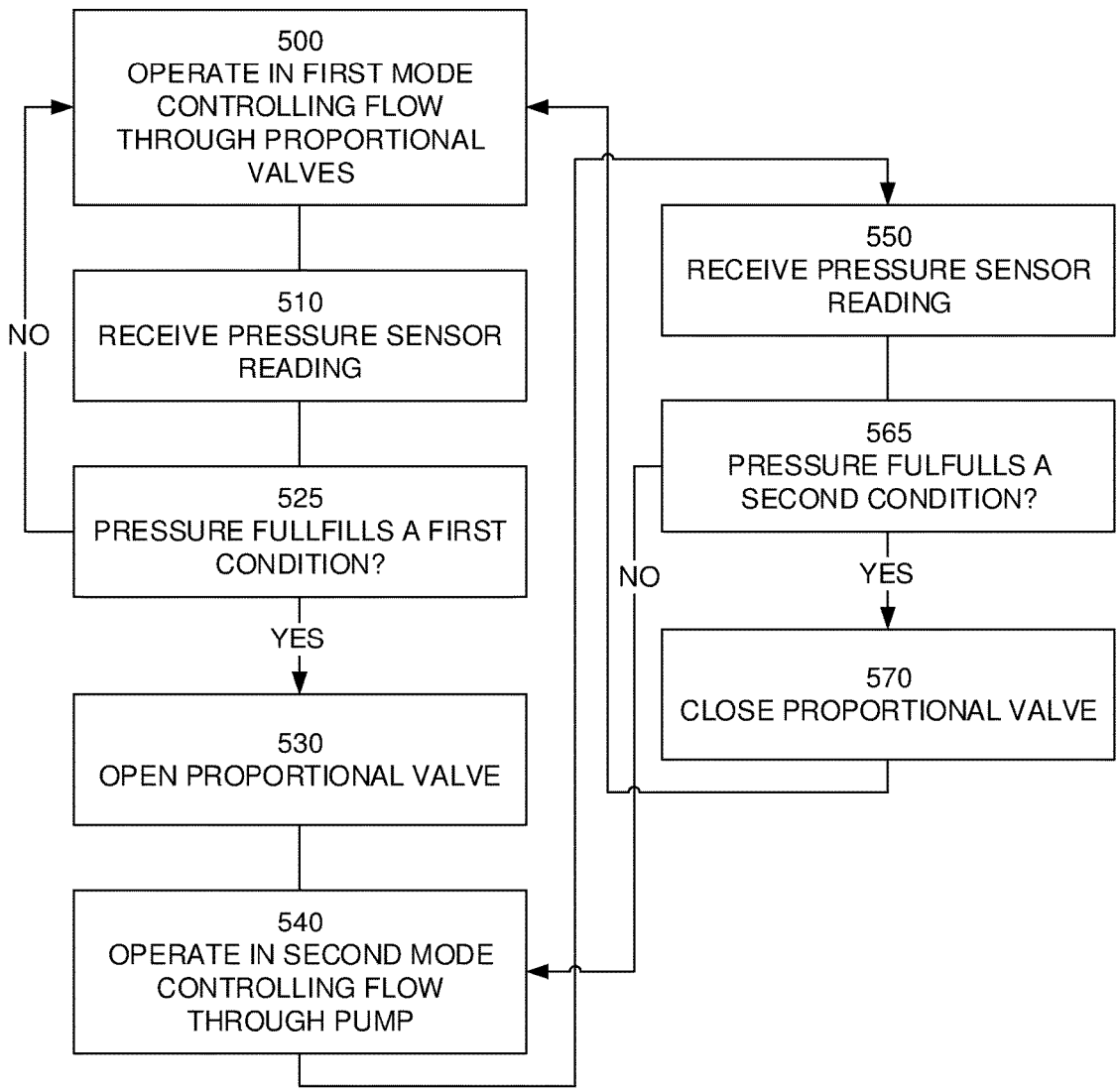
FIG. 5b shows a flowchart for a general method according to an embodiment of the teachings herein.

In addition to, or instead of, the controller 17 determining if the pressure indication is above a first mode threshold level 520 the controller 17 may, in some embodiments, determine if the pressure indication fulfills a first mode condition 525 relating to a change in pressure. This is shown in FIG. 5b.

In one embodiment the controller 17 determines if the pressure indication fulfills a first mode condition and/or if the pressure indication is above a first mode threshold, and if so, the controller opens 530 the valve 13a and starts to operate in a second mode where the flow is controlled by controlling the pump 410.

The first mode condition is a condition set up to that uses the information of pressure changes in the system. The first mode condition may be a condition comprising a time limit, pressure values, number of oscillations and/or a combination of the same. By looking at the pressure change information it is possible to determine if the system shall proceed into a second mode or continue working in the first mode.

Similarly, when the controller is operating in the second mode 540 the controller 17 may be configured to receive a pressure indication 550 from the pressure sensor 13b. The controller 17 determines if the pressure indicated by the pressure indication is below a second mode threshold level 560, and if so, the controller closes 570 the valve 13a and starts to operate in the first mode where the flow is controlled by controlling the valve 13a.

In one embodiment, the pump 410 comprises a pressure regulator 412. The pressure regulator 412 is provided to ensure that the pressure in the pump does not exceed a maximum value, for example 200 bar.

The pump 410 is thus arranged to operate using the pressure regulator 412 in the second mode.

The second mode threshold value may be set according to the arm member's indicated needed pressure, such as a minimum operating pressure. This may be input through for example the remote control 22, or it may be communicated to the controller 17 by a electronic control unit of the tool, such electronic control unit being considered to be part of the controller 17.

The second mode threshold is, in one embodiment set to be the needed pressure. The second mode threshold is, in one embodiment set to be the first mode threshold.

The second mode threshold is, in one embodiment set to be lower than the first mode threshold. In such an embodiment the first threshold may be set to be higher than the needed pressure and the second threshold may be set to be lower than the needed pressure.

As for the first mode threshold, the second mode threshold may also comprise several thresholds or a ramping function.

In addition to, or instead of, the controller 17, when operating in the second mode 540, determines if the pressure indication is below a second mode threshold level 560 the controller 17 may, in some embodiments, determine if the pressure indication fulfills a second mode condition 565 relating to a change in pressure. This is shown in FIG. 5b.

In one embodiment the controller 17 determines if the pressure indication fulfills a second mode condition 565 and/or if the pressure indication is below a second mode threshold, and if so, the controller closes 570 the valve 13a and starts to operate in the first mode where the flow is controlled by controlling the valve 13a.

The second mode condition is a condition set up to that uses the information of pressure changes in the system. The second mode condition may be a condition comprising a time limit, pressure values, number of oscillations and/or a combination of the same. By looking at the pressure change information it is possible to determine if the system shall proceed into a first mode or continue working in the second mode.

The controller 17 is thus configured to operate in the first mode (wherein flow control is achieved through throttling) when the pressure is low, and the second mode (wherein flow control is achieved through controlling the pump) when the pressure is high (enough), thereby reducing the energy wasted through heat dissipation in the valve.

In one embodiment the pressure indication may indicate a closed valve and will then not be used to determine the operating mode.

Compared with, for example, throttling all valves 13a, when the flow required to maintain a pressure is higher than the maximum flow of the pump, the present invention has the benefit of providing a higher power efficiency.

The valve 13a is beneficially an uncompensated valve 13a as it allows for the reduced pressure drop of the valve.

Figure 6:
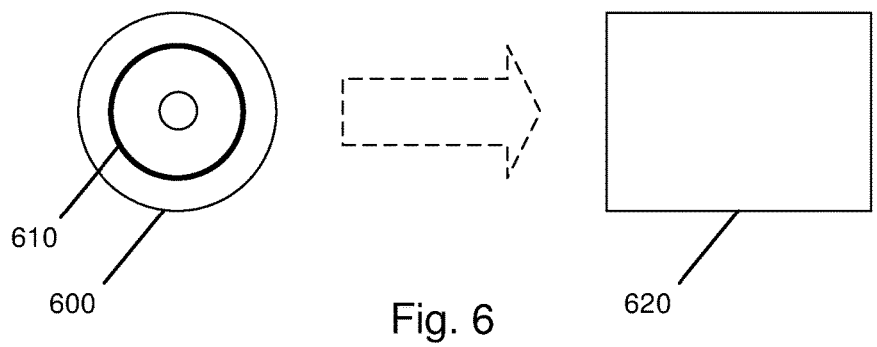
FIG. 6 shows a schematic view of a computer-readable product comprising instructions for executing a method according to one embodiment of the teachings herein.

FIG. 6 shows a computer-readable medium 600 comprising software code instructions 610, that when read by a computer reader 620 loads the software code instructions 610 into a controller, such as the controller 17, which causes the execution of a method according to herein. The computer-readable medium 600 may be tangible such as a memory disk or solid state memory device to mention a few examples for storing the software code instructions 610 or intangible such as a signal for downloading or transferring the software code instructions 610.

By utilizing such a computer-readable medium 600 existing robots 10 may be updated to operate according to the invention disclosed herein.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A remote controlled demolition robot comprising a controller and at least one actuator controlled through a hydraulic system comprising at least one valve connected to a corresponding actuator for a tool and a pump, wherein the controller is configured to:
 operate in a first mode wherein a fluid flow is controlled through the at least one valve, wherein said valve is a proportional valve;
 receive a pressure indication indicating a pressure in the hydraulic system, and
 determine if the pressure in the hydraulic system is above a first mode threshold and/or if a pressure change fulfills a first mode condition, and if so operate in a second mode wherein the at least one valve is in an opened state and the fluid flow is controlled through the pump.

2. The remote controlled demolition robot according to claim 1, wherein the controller is further configured to:
 determine if the pressure in the hydraulic system is below a second mode threshold and/or if a pressure change fulfills a second mode condition, and if so operate in the first mode.

3. The remote controlled demolition robot according to claim 1, wherein the valve is an uncompensated valve.

4. The remote controlled demolition robot according to claim 1, wherein the pump comprises a load sensing regulator, wherein the pump is configured to operate using the load sensing regulator in the first mode.

5. The remote controlled demolition robot according to claim 1, wherein the pump comprises a pressure regulator, wherein the pump is configured to operate using the pressure regulator in the second mode.

6. The remote controlled demolition robot according to claim 1, wherein the first mode threshold value is based on a minimum required operating pressure for moving an arm member.

7. The remote controlled demolition robot according to claim 3, wherein the first mode threshold value is higher than the minimum required operating pressure for moving an arm member.

8. The remote controlled demolition robot according to claim 2, wherein the second mode threshold value is based on a minimum required operating pressure for the moving an arm member.

9. The remote controlled demolition robot according to claim 8, wherein the second mode threshold value is lower than the minimum required operating pressure for moving an arm member.

10. The remote controlled demolition robot according to claim 1, wherein the pressure in the hydraulic system is a pressure for moving an arm member.

11. The remote controlled demolition robot according to claim 1, wherein the pressure in the hydraulic system is a system pressure for the hydraulic system.

12. The remote controlled demolition robot according to claim 1, wherein the first mode threshold level comprises several sub levels and wherein the controller is configured to open the valve successively as the pressure exceeds a corresponding sub level.

13. The remote controlled demolition robot according to claim 1, wherein the valve is over-dimensioned with respect to the pump in the hydraulic system.

14. The remote controlled demolition robot according to claim 1, wherein the tool is a saw or a cutter.

15. The remote controlled demolition robot according to claim 1, wherein the first mode condition comprises information relating to time, pressure values, number of oscillations and/or a combination of the same.

16. The remote controlled demolition robot according to claim 1, wherein the second mode condition comprises information relating to time, pressure values, number of oscillations and/or a combination of the same.

17. A method for operating a remote controlled demolition robot comprising at least one actuator controlled through a hydraulic system comprising at least one valve connected to a corresponding actuator for a tool and a pump, wherein the method comprises:
 operating in a first mode wherein a fluid flow is controlled through the at least one valve, wherein said valve is a proportional valve;
 receiving a pressure indication indicating a pressure in the hydraulic system, and
 determining if the pressure in the hydraulic system is above a first mode threshold and/or if a pressure change fulfills a first mode condition, and if so operate in a second mode wherein the at least one valve is in an opened state and the fluid flow is controlled through the pump.

18. A non-transitory computer readable medium comprising software code instructions, that when loaded in and executed by a controller causes an execution of the method according to claim 17.

* * * * *